(No Model.)

W. HIBBERT.
APPARATUS FOR PURIFYING ATMOSPHERIC AIR.

No. 404,621. Patented June 4, 1889.

Witnesses.
John Revell
S. C. Connor

Inventor.
William Hibbert
By his Attorneys
Howson and Howson

UNITED STATES PATENT OFFICE.

WILLIAM HIBBERT, OF MANCHESTER, COUNTY OF LANCASTER, ENGLAND.

APPARATUS FOR PURIFYING ATMOSPHERIC AIR.

SPECIFICATION forming part of Letters Patent No. 404,621, dated June 4, 1889.

Application filed October 30, 1888. Serial No. 289,511. (No model.) Patented in England January 31, 1885, No. 1,368.

*To all whom it may concern:*

Be it known that I, WILLIAM HIBBERT, manufacturing chemist, a subject of the Queen of Great Britain and Ireland, and residing at Clarence Street, Cheetham, Manchester, in the county of Lancaster, England, have invented Improved Apparatus for Purifying and Medicating Atmospheric Air and Distributing the Same when Required, (for which a patent has been granted to me in Great Britain, No. 1,368, dated January 31, 1885,) of which the following is a specification.

The principal objects of this invention are to provide mechanical appliances for deodorizing, disinfecting, or otherwise purifying atmospheric air from bacteria and other organisms or other contagious or deleterious influences and imparting medicinal—that is, prophylactic or therapeutic—properties (or both) thereto, and to distribute the same when so purified and medicated in a hospital or other building or room, or wherever else it may be desired. Part of my said invention will also allow of a person carrying with him and breathing or administering to another person purified or medicated air in a fog or in any other atmosphere charged with smoke or with deleterious or noxious gases.

Figure 1:
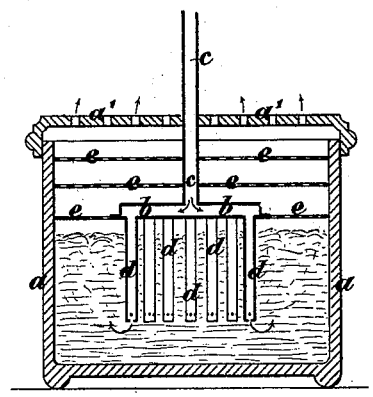
Figure 2:
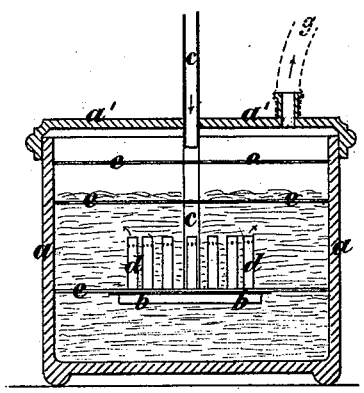
Figure 3:
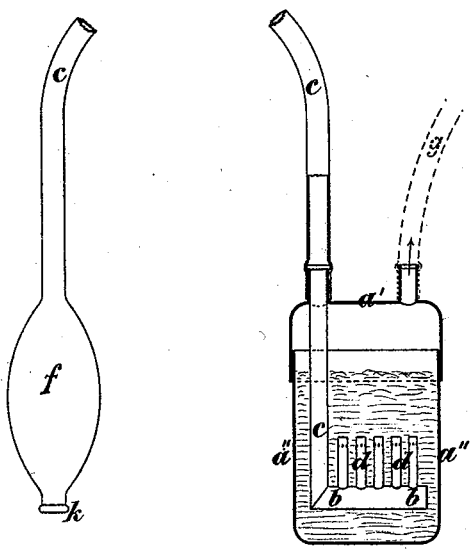

In the accompanying drawings, Figure 1 is a section showing the apparatus in its fixed form. Fig. 2 is a slightly-modified construction, and Fig. 3 shows the portable form of the same.

The exterior of this apparatus may be made of any convenient size and shape and of any suitable material, care being taken that the latter shall be such that no oxidation or other chemical effect may be produced thereon by contact with the chemical or medical solution employed.

In Fig. 1, *a* is a vessel, of glass, porcelain, vitrified metal, or other material, open at the top, or provided with a perforated cover *a'*, and closed beneath, and of a cylindrical or other suitable shape. The size and number of these vessels will depend upon the area of the chamber or other place where the air is to be distributed, and they may be arranged on brackets or shelves against the walls, or they may be suspended from the ceiling, as may be thought desirable.

Each vessel *a* is provided at or near the center of its height with a shallow closed chamber *b*, into which the branch pipe *c* discharges the compressed air to be purified or medicated, the said pipe *c* being connected with suitable means of compressing or forcing forward the said air as required. Into holes in the under side of this chamber *b* are screwed or otherwise fitted the upper ends of a series of vertical tubes *d*, the lower ends of which are closed. These tubes *d* are perforated with fine holes toward the lower ends, some of them being perforated through the closed end, but are not perforated toward their upper part.

The vessel *a* is filled to a certain depth above the perforated part of the pipes with a medicated solution, and it will be evident that as the compressed air is forced through the fine perforations in the vertical tubes *d* it will be divided into very minute particles, which, rising up through the medicated solution, will not only be thoroughly agitated, washed, purified, and cleansed from all bacteria and other organisms, or from any other contagious or deleterious influences, but it will at the same time absorb or become impregnated with medicinal or other properties, according to the nature of the solution employed and the effect desired to be produced.

I would here remark that I sometimes place the closed chamber *b* nearer to the bottom of the vessel *a*, as shown in the section, Fig. 2, in which case the position of the vertical perforated pipes *d* will be reversed. I also sometimes only perforate the cover *a'* with one hole, as shown at Fig. 2, in which I fix a short pipe for attaching a hose *g* for conveying the purified and medicated air to any particular part of the room where it may be required. After the air thus purified and medicated has risen through the solution it passes through the perforated zinc plates *e e*, where it is further broken up, and then out into the atmosphere through the open top of the vessel *a*, and it is thus distributed into and replaces the air of the room or chamber in which it is required. In some cases I dispense with these perforated plates *e e*.

It is evident that the solution placed in the open vessel *a* may be of any nature that may be desired, either simply to wash or purify the air or to deodorize or disinfect the same, if required, or to impart the properties of either mild or strong sea or other desirable air, or to ozonize, oxygenize, sulphurize, or otherwise medicate the air before distribution, as may be required. The vessel $a$ may also be provided with a tap, by means of which the solution may be drawn off as often as it becomes too much charged with impurities from the washing of the air, or when it loses its strength by imparting its medicinal properties to the air, when a fresh supply of the solution can be poured in from the top, so as to keep the apparatus in an efficient state.

As regards the portable apparatus, that may also be made in various forms and sizes, according to circumstances, the washing and medicating vessel being by preference of a convenient flask-like form to carry in the breast-pocket of a coat, as shown at Fig. 3. This vessel $a''$ will be provided with an elastic tube $g$, of any suitable length, to convey the purified air to a mouth-piece, which may be either made funnel-shaped, so as to inclose the mouth and nostrils, or it may be provided with short tubes to be held in the mouth and nostrils. This tube $g$ is provided with a double-action valve $v$, which will allow the purified and medicated air to be admitted inward to the lungs in breathing, but causes all air passing outward from the lungs to be expelled into the atmosphere.

The external air is forced through the solution in the vessel $a''$ by means of an elastic bag or ball $f$, provided with an inlet-valve $k$ to admit the air, and is connected by the pipe $c$ to the shallow chamber $b$ of the washing and medicating apparatus. The elastic bag or ball $f$ may be carried in the hand, in the side pocket, and by alternately pressing and releasing the same by a slight movement of the fingers it will draw the air into itself and force it out again through the medicated solution in the vessel $a''$, whence it is conveyed by the tube $g$ to the mouth and nostrils of the user or to any other place required.

It will be evident that by these means the user of this apparatus can breathe or can administer to a patient pure, medicated, or sea or other desirable air, whatever may be the state (foggy or otherwise) of the external atmosphere. It will also enable a person to enter and remain a certain time in any room or other place full of smoke, or in a well, mine, or other place charged with deleterious gases, while himself breathing pure or medicated air.

I claim as my invention—

1. An apparatus for washing, purifying, and imparting medicinal properties to air, consisting of a vessel partly filled with an antiseptic mixture, an inner compartment, a series of finely-perforated tubes extending from the said compartment into the mixture, and a supply-pipe through which compressed air may be forced into the compartment and tubes, substantially as set forth.

2. A portable apparatus for cleansing and purifying air, consisting of a vessel containing an antiseptic mixture and a compartment having finely-perforated tubes, said compartment provided with an attachment consisting of a rubber pipe having a bulb and inlet-valve, whereby air is forced into the compartment, an outlet from the vessel, and a pipe connecting the outlet to a mouth-piece provided with a double-acting valve, substantially as set forth.

In testimony whereof I have signed my name to this specification in the presence of two subscribing witnesses.

WILLIAM HIBBERT.

Witnesses:
GEORGE DAVIES,
CHARLES A. DAVIES.